(12) United States Patent
Birchler et al.

(10) Patent No.: US 7,796,633 B2
(45) Date of Patent: Sep. 14, 2010

(54) RANGE EQUALIZATION TRANSCEIVER SYSTEM AND METHOD OF USING SAME

(75) Inventors: Mark A. Birchler, Roselle, IL (US); Jeffrey D. Bonta, Arlington Heights, IL (US); Steven C. Jasper, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 861 days.

(21) Appl. No.: 11/383,077

(22) Filed: May 12, 2006

(65) Prior Publication Data

US 2007/0263551 A1 Nov. 15, 2007

(51) Int. Cl.
*H04J 3/16* (2006.01)

(52) U.S. Cl. .............. 370/437; 370/310.2; 370/328; 370/351; 370/355; 370/356; 455/41.2; 455/41.3; 455/435.2; 455/450; 455/451; 455/452.1; 455/452.2; 455/453; 455/552.1; 455/553.1

(58) Field of Classification Search .............. 370/310.2, 370/328, 351, 355, 356, 437; 455/41.2, 41.3, 455/450–453, 435.2, 552.1, 553.1
See application file for complete search history.

(56) References Cited

U.S. PATENT DOCUMENTS

| 5,781,598 | A | * | 7/1998 | Hardy, III | 375/372 |
|---|---|---|---|---|---|
| 6,167,031 | A | * | 12/2000 | Olofsson et al. | 370/252 |
| 6,747,964 | B1 | * | 6/2004 | Bender | 370/335 |
| 6,804,532 | B1 | * | 10/2004 | Moon et al. | 455/552.1 |
| 6,917,815 | B2 | * | 7/2005 | Hajimiri et al. | 455/552.1 |
| 6,985,454 | B1 | * | 1/2006 | Wiedeman et al. | 370/316 |
| 7,190,683 | B2 | * | 3/2007 | Giallorenzi et al. | 370/335 |
| 2004/0022224 | A1 | * | 2/2004 | Billhartz | 370/338 |
| 2004/0082308 | A1 | * | 4/2004 | Ngai et al. | 455/322 |
| 2004/0142723 | A1 | * | 7/2004 | Shippee | 455/552.1 |
| 2005/0111462 | A1 | * | 5/2005 | Walton et al. | 370/395.4 |
| 2005/0282494 | A1 | * | 12/2005 | Kossi et al. | 455/41.2 |
| 2006/0194611 | A1 | * | 8/2006 | Pasternak | 455/553.1 |

OTHER PUBLICATIONS

PCT/US07/67043, International Search Report and Written Opinion, mailed Jun. 18, 2008, 9 pages.
PCT/US2007/067043, Preliminary Report on Patentability, mailed Nov. 27, 2008, 8 pages.

* cited by examiner

*Primary Examiner*—Stephen M D'Agosta
(74) *Attorney, Agent, or Firm*—Randi L. Karpinia (57) ABSTRACT

A range equalization transceiver system (100) for increasing efficiency of a continuous duty communications link includes a first transceiver (105) for transmitting data traffic over a broadband traffic channel and a second transceiver (107) for determining routing information using a discovery channel based on link quality. A controller (103) is used for interpreting routing information from the second transceiver (107) where the controller (103) selects a transmitting scheme based on data traffic conditions on both the broadband traffic channel and link quality channel for sending data over a wireless network.

20 Claims, 5 Drawing Sheets

RANGE EQUALIZATION TRANSCEIVER SYSTEM AND METHOD OF USING SAME

FIELD OF THE INVENTION

The present invention relates generally to wireless local area networks (WLAN) and, more particularly, to providing a continuous duty operation mode with minimal current drain.

BACKGROUND

Ad hoc networking between mobile devices is well known in the art. Differing types of networking techniques are often used to maintain both high performance and low complexity for receivers used in an ad hoc networking environment. Transceivers are typically used in an "always on" operational mode that allows the devices to receive all possible route discovery/maintenance signaling over the network. Alternatively, complex synchronization/scheduling schemes are needed to enable "sleep modes" where the receiver is turned off to conserve battery energy. These techniques require the transceiver to be operational at select times to receive required signaling information and data.

However, to adequately serve the requirements for route discovery under the Institute of Electrical and Electronics Engineers (IEEE) 802.11a, 802.11b, 802.11g, and 802.11n standards, the transceiver operates such that it consumes relatively high amounts of battery energy at a rate that significantly reduces the stand-by time of a mobile device. Therefore, the need exists for a low complexity ad hoc networking solution that enables ad hoc network creation (i.e., route discovery and maintenance) in an "always on" mode that does not cause significant stand-by time reduction or a "sleep mode" that does not have excess complexity or high communication latency.

One prior art solution to this problem uses a low-energy single IEEE 802.11 transceiver with complex synchronization/scheduling algorithms. In this solution, the duty cycle of the receiver "on mode" is significantly reduced in order to reduce energy consumption. Thus, it would be advantageous to provide a system and method whereby all route discovery and maintenance signaling can be heard without the burden of excessive current drain that is inherent in an always "on" receiver.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 3, 3A and 3B are a flow chart diagrams illustrating the protocol description when instructing broadcast traffic transceivers to send packet traffic using a broadcast traffic channel.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for providing a continuous duty operation mode in a WLAN in order to conserve current drain in a portable device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for providing a continuous duty operation mode in a WLAN in order to conserve current drain in a portable device described herein. The non-processor circuits may include, but are not limited to, a radio receiver, a radio transmitter, signal drivers, clock circuits, power source circuits, and user input devices. As such, these functions may be interpreted as steps of a method to provide a continuous duty operation mode in a WLAN in order to conserve current drain in a portable device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
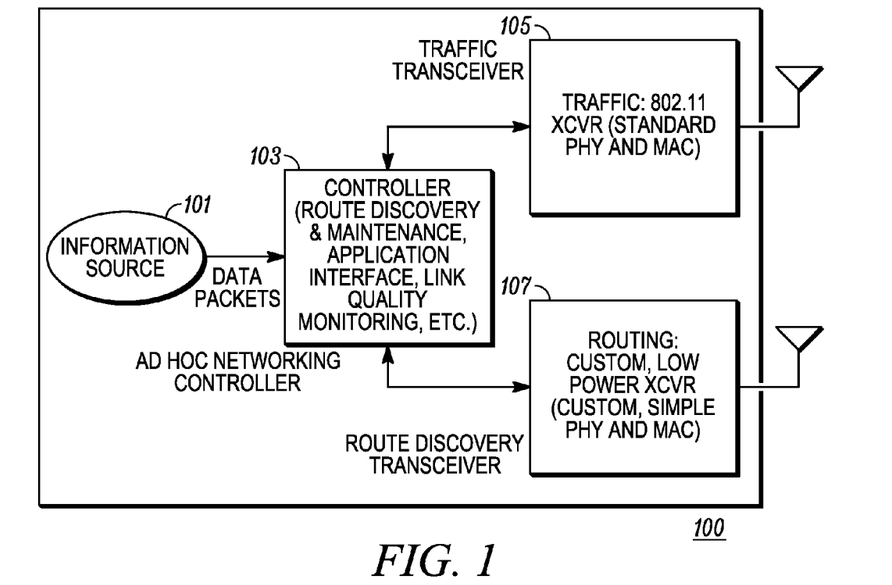
FIG. 1 is a block diagram illustrating a dual transceiver solution in accordance with an embodiment of the invention.

FIG. 1 is a block diagram illustrating a wireless communications device 100 using an information source 101, an ad hoc networking controller 103, a broadband traffic transceiver 105 and a route discovery transceiver 107. The broadband traffic transceiver 105 operates on a broadband traffic channel for handling standard physical layer and medium access control (MAC) layer traffic while the route discovery transceiver 107 utilizes a route discovery channel for transmitting and receiving custom and/or simple physical layer messages as well as MAC control functions.

In accordance with the present invention, the ad hoc networking controller 103 is included within each ad hoc networking device 100 along with a broadband traffic transceiver 105 and a route discovery transceiver 107. The ad hoc networking controller 103 contains a route discovery and a route maintenance algorithm as well as a routing table database that provides information necessary to deliver data packets (control and data traffic) to any destination node known to the ad hoc networking device. The broadband traffic transceiver 105 contains a medium access control and physical layer control (MAC/PHY) for the transport of broadband traffic data over a broadband traffic channel. The route discovery transceiver 107 contains a MAC/PHY that operates the route discovery channel that may be the same frequency band as used by the broadband traffic transceiver for the broadband traffic channel. Those skilled in the art will recognize that the route discovery transceiver 107 is dedicated to transporting route discovery and route maintenance control messages as well as other control information used for ad hoc network control and maintenance such as session management, resource allocation, interference mitigation, and the like. The route discovery transceiver 107 is typically used to process routing information at a much higher rate than the broadband traffic transceiver sends data packet traffic. This requires the route discovery transceiver 107 to have a much lower current drain in order to conserve portable battery power in view of its higher duty cycle.

Figure 2:
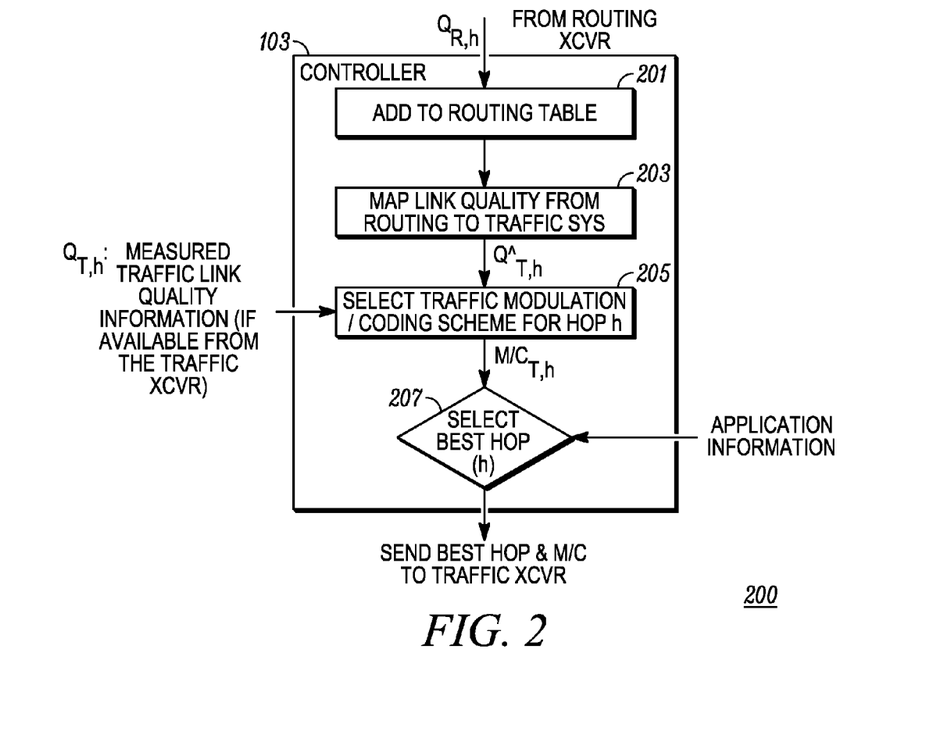
FIG. 2 is block diagram illustrating a transceiver equalization diagram of the controller as seen in FIG. 1.

FIG. 2 illustrates an operation of the ad hoc networking controller 103 in accordance with an embodiment of the present invention. Specifically, FIG. 2 illustrates incoming data packets received by the ad hoc networking controller 103 where a routing algorithm examines the routing tables to determine if the destination address has a known route or communication path. In the event that a route is not known, the ad hoc networking controller 103 invokes its route discovery procedure to locate the proper route to the destination address. For example, if the route discovery procedure is an ad hoc on-demand distance vector (AODV), the ad hoc networking controller 103 constructs a route request (RREQ) message to be delivered to the route discovery transceiver 107 for transport over the route discovery channel. The route discovery transceiver 107 broadcasts the RREQ message to all surrounding nodes in search of the ad hoc node associated with the destination address. If an intermediate ad hoc networking device's route discovery transceiver receives the RREQ, it delivers the RREQ to the ad hoc networking controller 103.

The ad hoc networking controller of the intermediate node then updates its routing table 201 with information about how to return data packets back to the source node and then constructs a new RREQ message to be delivered to the route discovery transceiver. The route discovery transceiver 107 re-broadcasts the RREQ. Once the destination node's route discovery transceiver receives the RREQ, it delivers the RREQ to its ad hoc networking controller. The ad hoc networking controller updates its routing table with information about how to return data packets back to the source node and then constructs a route reply (RREP) and deliver it back to the route discovery transceiver.

Thereafter, the route discovery transceiver 107 unicasts the RREP to a specified ad hoc networking device that provides a route back to the source (again transported over the route discovery channel). Once the source route discovery transceiver receives the RREP, it delivers the RREP to its ad hoc networking controller. The ad hoc networking controller 103 then updates its routing table with the appropriate information (e.g., address of the next device toward the destination address representing the route to the destination ad hoc device) so that future attempts to send data packets to the destination can bypass the route discovery procedure. At this time, the ad hoc networking controller 103 wakes up the broadband traffic transceiver 105 and delivers the pending data packet along with the MAC address of the next ad hoc device in route to the final destination address. The broadband traffic transceiver 105 utilizes its own MAC/PHY to transport the data packet to the next ad hoc device along the route to the final destination address using the broadband traffic channel. From this point on, any new data packets received by the ad hoc networking controller 103 for that specific destination address are sent directly to the broadband traffic transceiver 105 which delivers them as addressed.

The ad hoc networking controller 103 now enters into a route maintenance mode. Link quality information and/or success/failure indications for packet delivery of each transmitted data packet may trigger the ad hoc networking controller to invoke a new route discovery procedure so that it can continue delivering data packets to the requested destination address. If a new route discovery procedure must be invoked, the procedure operates as discussed above. Namely, all route discovery messages are sent via the route discovery transceiver transported over the route discovery channel. These messages may continue in parallel to data packets that are being sent to the broadband traffic transceiver for transport over the broadband traffic channel.

FIG. 2 further illustrates the ad hoc networking controller 103 obtaining link quality metrics $Q_{r,n}h$ 203 for available next hops from the routing transceiver 107. The link quality metrics can be, for example, a radio signal strength indication (RSSI), and/or a carrier-to-interference plus noise (C/I+N) measurement. Those skilled in the art will recognize that other metrics can be used to assess the link quality. The RSSI information is generated by measuring the received signal power level at the next hop receivers. C/I+N information at the next hop can be obtained by regeneration of the known component of a received symbol or symbols and then subtracting the regenerated symbol from the actual received symbol sample. Next hop systems include this link quality metric information in their acknowledgment transmissions. The routing transceiver 107 passes the link quality metric information back to the controller. The controller thereafter includes the received link quality metric information in the routing table.

The stored link quality metric information is then used to determine which modulation/coding scheme 205 is available to the traffic transceiver 105 that enables reliable traffic transmission over each of the available next hops 207. This step is accomplished by mapping link quality measured on the routing system to the expected link quality on the traffic system. This mapping is implemented by the application of predetermined adjustment factors between the routing and traffic systems including, for example, differences in transmit power, noise figure, operating frequency and antenna gain. These adjustment factors can be refined over time based on actual traffic link quality metrics obtained as an integral part of the traffic communication. This decision can be made in conjunction with higher layer information. For example, whereas voice over internet protocol (VoIP) traffic can be assigned to a low data throughput modulation/coding scheme, high resolution video traffic may require a much higher data throughput modulation/coding scheme. Given knowledge of the minimum data throughput required, the controller 103 selects a modulation/coding scheme (if any) that results in reliable and sufficient traffic transmission given knowledge of the link quality metric and the minimum required link quality as a function of the available modulation/coding schemes.

Figure 3A:
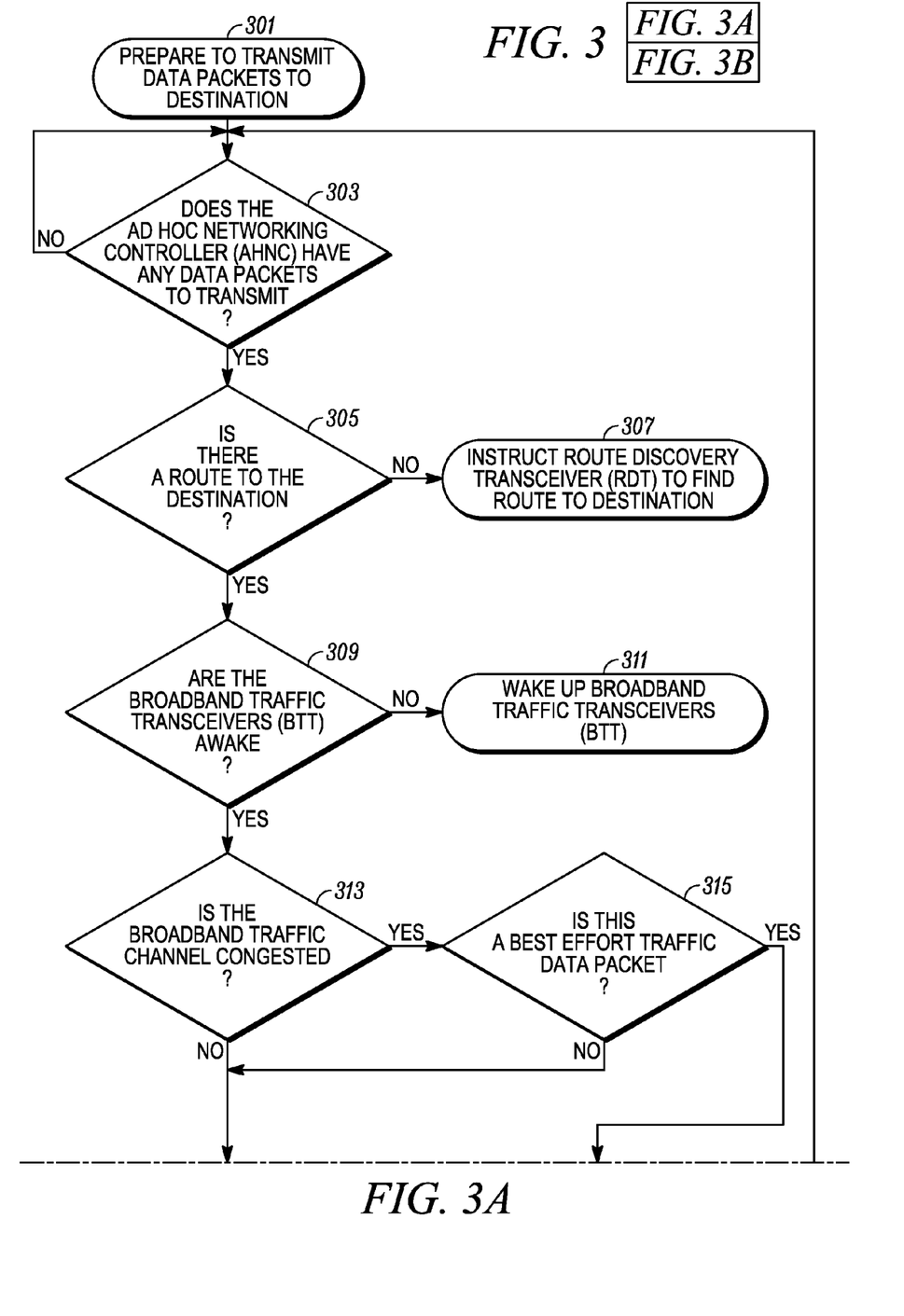
Figure 3B:
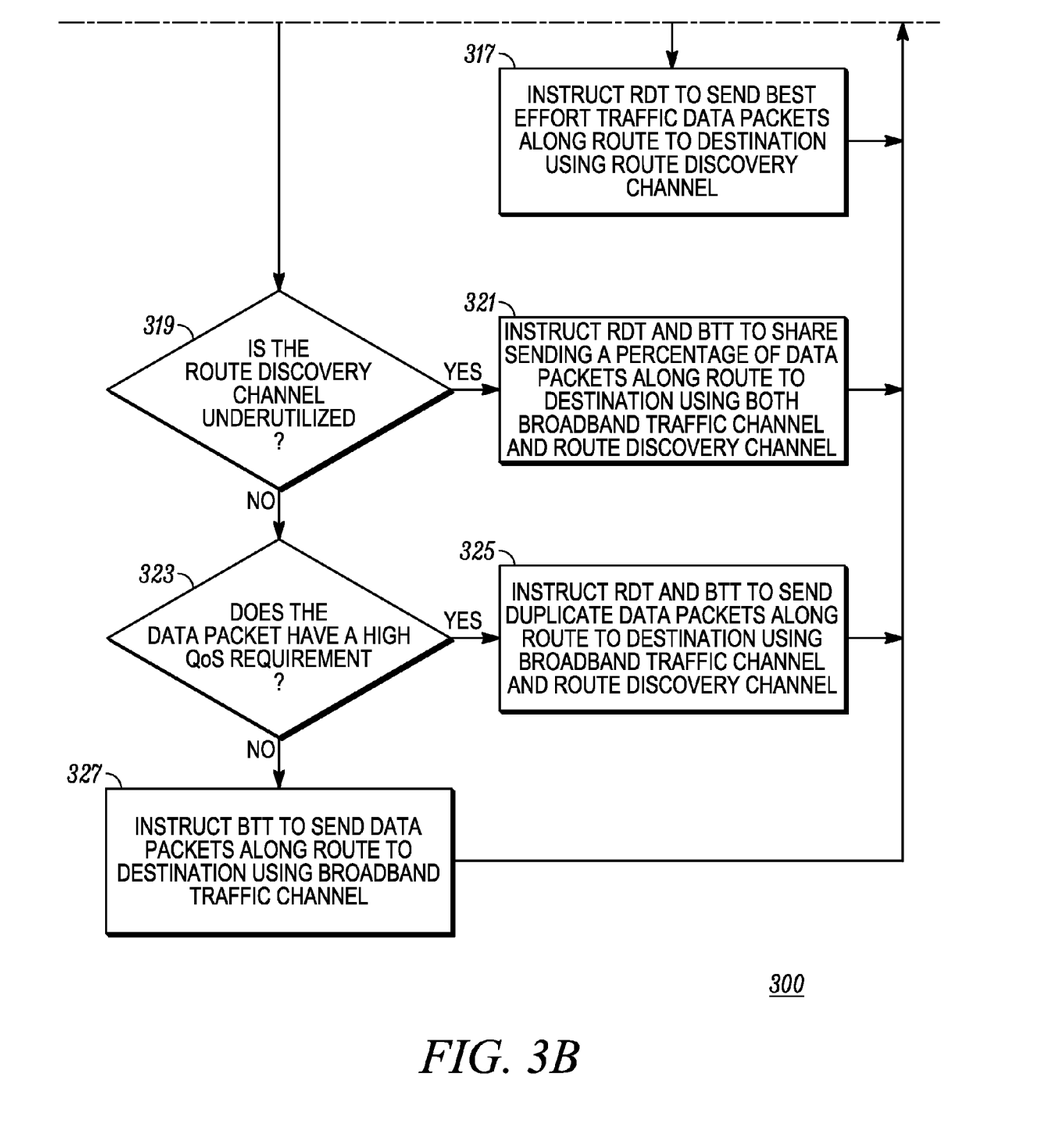

FIGS. 3, 3A and 3B) are flow chart diagrams 300 illustrating the method used by the controller for sending data packets and for selecting the appropriate communications channel. Once data packets are prepared for transmission to a destination 301, determination is made whether the ad hoc network controller (AHNC) has any data packets to transmit 303. When there are packets to transmit, the determination is made whether a route to the destination 305 has been identified. If no route to the destination has been identified, then the route discovery transceiver (RDT) is instructed to find a route to destination 307. The method for determining route discovery is further described and illustrated in FIG. 4 hereinafter. If there is a route to the destination, then it is determined if the broadband traffic transceiver (BTT) is awake 309. If the BTT is not awake, then a process for awakening the BTT is set forth 311. The process for awakening the BTT is more fully described and illustrated with reference to FIG. 5 as described hereinafter. If the BTT is awake, it is determined if the broadband traffic channel is congested 313. If the channel is congested, it is determined if this is a best effort traffic data packet 315. If it is a best effort data traffic packet, then the RDT is instructed to send best effort traffic data packets along a route to destination using the route discovery channel 317. Since best effort or non-real time traffic has no time constraints on the inter-packet spacing or on the delivery time of these packets, it is deemed acceptable to transmit these packets at a lower priority than real time packets or routing control packets. For this reason, the RDT becomes a valid option as a transmission channel for these packets. Once best effort traffic data packets are transmitted, a determination is made if the AHNC has any data packets to transmit 303 and the process begins anew.

When the data packet is not best effort traffic 315, then the data packet is real time traffic. Since real time traffic has tighter constraints on the inter-packet spacing and the delivery time of these packets, these packets must be given higher priority over best effort traffic. For example, VoIP packets can be generated every 20 milliseconds. If the delay in receiving these packets becomes too great, then the speech frames associated with these packets become stale and must be discarded. Discarding too many real time packets will jeopardize the perceived quality of the connection. For this reason, every effort is given to ensure timely delivery of these packets. To accomplish this, it is then determined if the route discovery channel is underutilized 319. If the route discovery channel is underutilized, the RDT and BTT are instructed to share sending a predetermined percentage of data packets along a route to the destination using the broadcast traffic channel and the route discovery channel 321. Once these data packets are transmitted, a determination is again made if the AHNC has any data packets to transmit 303 and the process begins anew. If the route discovery channel is not underutilized, a determination is made if the data packet has a high quality of service (QoS) requirement 323. If the data packet does have a high QoS requirement, the RDT and BTT are instructed to send duplicate data packets along the route destination using the broadcast traffic channel and the route discovery channel 325 to increase the reliability of the data packet being received.

Thereafter, a determination is again made if the AHNC has any data packets to transmit 303 and the process begins anew. If the data packet does not have a high QoS requirement, the BTT is instructed to send data packets along a route to destination using only the broadcast traffic channel 327. Again, a determination is made if the AHNC has any data packets to transmit 303 and the process begins anew.

Figure 4:
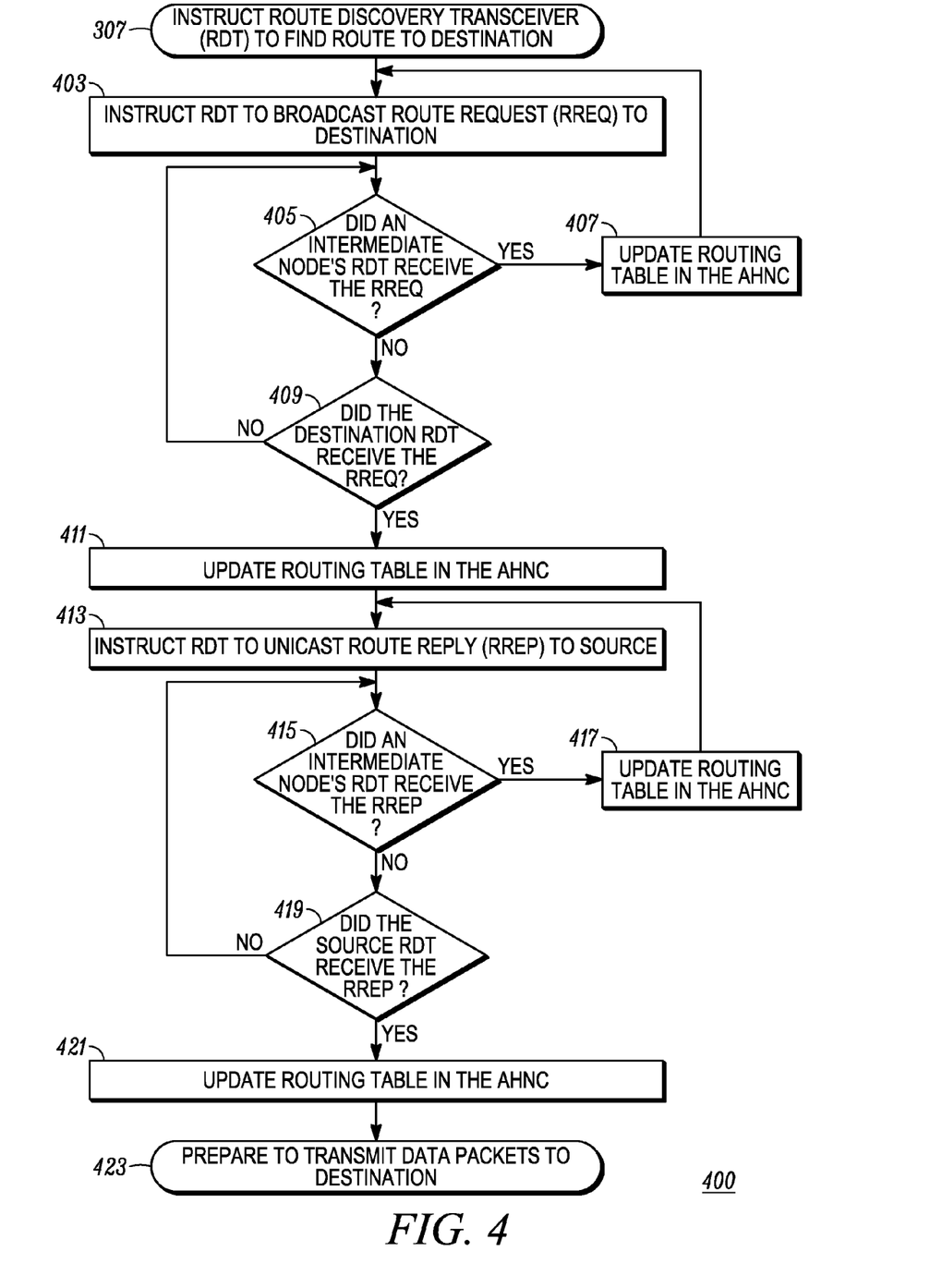
FIG. 4 is a flow chart diagram illustrating a method for determining traffic routing.

FIG. 4 is a flow chart diagram illustrating the process for route determination 400. Once the RDT has been instructed to find the route to destination 307, the RDT broadcasts the route requests (RREQ) to destination 403. If the intermediate node's RDT has received the RREQ 405, then a routing table in the AHNC is updated 407. If an intermediate node's RDT has not received the RREQ, then a determination is made if the destination RDT has received the RREQ 409. If not, then the process continues to determine if the intermediate node's RDT or the destination node's RDT has received the RREQ 405. If the destination RDT has received the RREQ, then the routing table in the AHNC is updated 411. Thereafter, the RDT is instructed to unicast the route reply (RREP) to a source 413. If an intermediate node's RDT has received the RREP 415, then the routing table in the AHNC is updated 417. If the intermediate node's RDT has not received the RREP, then it is determined if the source RDT has received the RREP 419. Thereafter a routing table is updated in the AHNC 421 and the transmit data packets are prepared to the destination 423.

Figure 5:
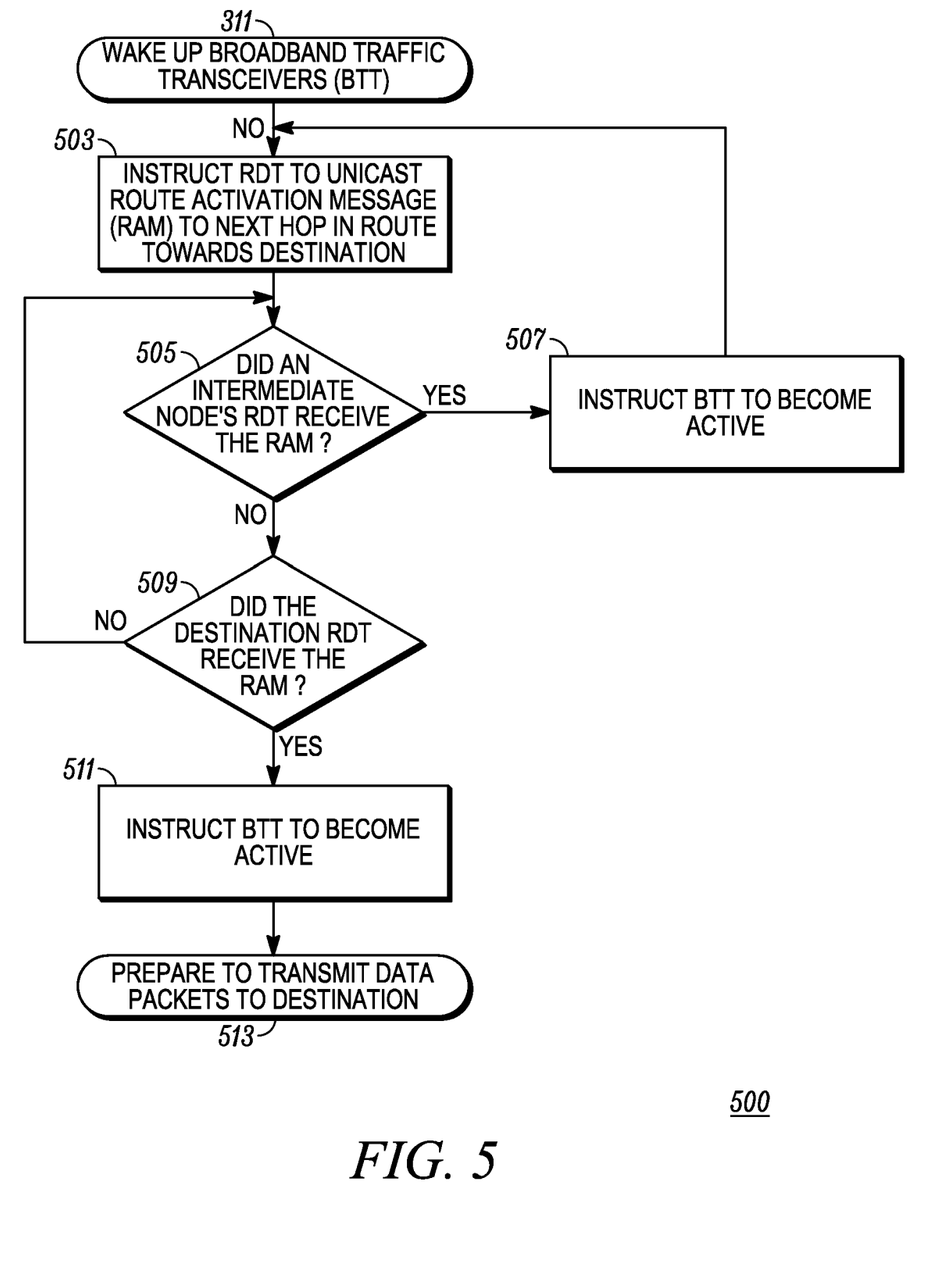
FIG. 5 is a flow chart diagram illustrating a method for preparing transmit data packets to a destination.

FIG. 5 is a flow chart diagram 500 illustrating a method of waking up the broadband transceiver using a route discovery transceiver. If the BTTs along the route to the destination need to wake up 311, then the RDT is instructed to unicast the route activation message (RAM) to the next hop in the route toward destination 503. If an intermediate node's RDT receives the RAM 505, then the BTT is instructed to become active 507. This is typically performed via the AHNC. If the intermediate node's RDT does not receive the RAM, a determination is made if the destination RDT received the RAM 509. If the destination RDT has not received the RAM, then the process continues to determine if the intermediate node's RDT or destination node's RDT has received the RAM 505. If the destination RDT has received the RAM, then the BTT is instructed to become active 511. This is typically performed via the AHNC. Thereafter, a transmit data packet to destination 513 is prepared as described in FIGS. 3, 3A and 3B.

Thus, the present invention includes the use of a dual transceiver solution which uses both an IEEE 802.11 transceiver and a second transceiver which is a custom, extremely low-power system routing transceiver that is used to handle only route discovery/maintenance functions. These two transceivers will generally separate the transmission channels by approximately five (5) percent of the operating center frequency in order to ensure adequate isolation to allow simultaneous transmission on one transceiver and receive on the other transceiver. This result, for example, can be accomplished with both transceivers operating in the 5 GHz unlicensed band (i.e., channels are available that are 250 MHz apart) or by operating one in the 5 GHz and the other in the 2.4 GHz band. A routing function transceiver has a data rate significantly lower than that used for IEEE 802.11. Therefore, the transmit power of the routing transceiver would be set lower than that used for 802.11 in order to obtain range equivalence (which ensures routes that are neither too aggressive nor conservative given the range of the 802.11 traffic system). In that the routing transceiver is significantly lower in power consumption than the IEEE 802.11 transceiver, a benefit of the present invention is that the ad hoc networking devices can remain operational for a significantly longer period of time. Another benefit of the present invention is that the ad hoc networking devices can be constructed with a significant reduction in the complexity of the synchronization/scheduling system. In an optimal scenario, the routing transceiver would be always in an "on" state.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A two-way radio transceiver system comprising:
    a first transceiver for transmitting data traffic over a broadband traffic channel;
    a second transceiver for determining routing information using a route discovery channel;
    a controller for interpreting routing information from the second transceiver; and
    wherein the controller selects a transmitting scheme based on the routing information for sending at least one data packet, wherein the transmitting scheme comprises:
        transmitting, by the second radio transceiver, the at least one data packet along a route to a destination using both the broadband traffic channel and the route discovery channel when the broadband traffic channel is congested;
        sharing transmitting, by the first radio transceiver and second radio transceiver, of the at least one data packet using both the broadband traffic channel and the route discovery channel when the route discovery channel is underutilized; and
        transmitting, by both the first radio transceiver and second radio transceiver, a duplicate of the at least one data packet along a route to a destination using the broadband traffic channel and the route discovery channel when the at least one data packet has a high quality of service (QoS) requirement.

2. A two-way radio transceiver system as in claim 1, wherein the transmitting scheme includes both traffic modulation and coding of data packets.

3. A two-way radio transceiver system as in claim 1, wherein the second transceiver operates at a low power level for decreasing the amount of current drain.

4. A two-way radio transceiver system as in claim 1, wherein the second transceiver operates at a high duty cycle for continually receiving routing information.

5. A two-way radio transceiver system as in claim 1, wherein the first transceiver and second transceiver are used in an inversely proportional manner depending on utilization of the route discovery channel.

6. A two-way radio transceiver system as in claim 1, wherein
    the first radio transceiver operates at a first power level;
    the second radio transceiver operates at a second power level below that of the first power level; and
    the controller selects the transmitting scheme based on quality of service (QoS) information within the routing information.

7. A two-way radio transceiver system as in claim 6, wherein the second radio transceiver operates at a high duty cycle in order to conserve current drain on the two-way radio transceiver system.

8. A two-way radio transceiver system as in claim 6, wherein the controller performs route discovery based upon the QoS information.

9. A two-way radio transceiver system as in claim 6, wherein the transmitting scheme includes both modulation type and coding scheme.

10. A two-way radio transceiver system as in claim 6, wherein the first transceiver and second transceiver are used in an inversely proportional manner depending on utilization of the route discovery channel.

11. A two-way radio transceiver system as in claim 6, wherein the first transceiver operates using an IEEE 802.11 standard.

12. A method for determining range equalization in a two-way radio transceiver system comprising the steps of:
    establishing a broadband traffic channel for transmitting data using a first radio transceiver;
    establishing a route discovery channel for determining routing information using a second radio transceiver;
    determining whether a network controller has at least one data packet to transmit over the broadband traffic channel;
    instructing the second radio transceiver to transmit the at least one data packet along a route to a destination using both the broadband traffic channel and the route discovery channel when the broadband traffic channel is congested;
    instructing the first radio transceiver and second radio transceiver to share transmitting of the at least one data packet using both the broadband traffic channel and route discovery channel when the route discovery channel is underutilized; and
    instructing the first radio transceiver and second radio transceiver to both send a duplicate of the at least one data packet along a route to a destination using the broadband traffic channel and the route discovery channel when the at least one data packet has a high quality of service (QoS) requirement.

13. A method for determining range equalization in a two-way radio transceiver system as in claim 12, further comprising:
    transmitting a first portion of the data packets using the first radio transceiver; and
    transmitting a second portion of the data packets using the second radio transceiver,
    wherein the first portion and the second portion are determined based upon a link quality of the broadband traffic channel and a link quality of the route discovery channel and a quality of service requirement of the data packets.

14. A method for determining range equalization in a two-way radio transceiver system as in claim 13, wherein the controller operates to determine the status of the broadband traffic channel and the route discovery channel.

15. A method for determining range equalization in a two-way radio transceiver system as in claim 13, further comprising:
    operating the second radio transceiver at a low power level in order to conserve overall current drain of the two-way radio transceiver system.

16. A method for determining range equalization in a two-way radio transceiver system as in claim 13, further comprising:
- selecting a coding scheme for the transmission of the first portion of the data packets based on the link quality of the broadband traffic channel; and
- selecting a coding scheme for the transmission of the second portion of the data packets based on the link quality of the route discovery channel.

17. A method for determining range equalization in a two-way radio transceiver system as in claim 13, wherein the first portion and the second portion of the data packets are further determined based on a utilization of the route discovery channel.

18. A method for determining range equalization in a two-way radio transceiver system as in claim 12, wherein the network controller selects a transmitting scheme including both traffic modulation and data packet coding.

19. A method for determining range equalization in a two-way radio transceiver system as in claim 12, wherein the second radio transceiver operates at a low power level for decreasing the amount of current drain in the two-way radio transceiver system.

20. A method for determining range equalization in a two-way radio transceiver system as in claim 12, wherein the second transceiver operates at a high duty cycle for continually processing routing information.

\* \* \* \* \*